Jan. 6, 1942.   C. G. TURNER ET AL   2,269,324
LIGHT RESPONSIVE APPARATUS FOR CONTROLLING LINEAR VOLTAGE
Filed March 14, 1938

INVENTORS
Carroll G. Turner, and
John M. Arthur, Jr.
BY
ATTORNEY

Patented Jan. 6, 1942

2,269,324

UNITED STATES PATENT OFFICE 2,269,324

LIGHT RESPONSIVE APPARATUS FOR CONTROLLING LINEAR VOLTAGE

Carroll G. Turner, North Kansas City, Mo., and
John M. Arthur, Jr., Kansas City, Kans.

Application March 14, 1938, Serial No. 195,794

1 Claim. (Cl. 240—1)

This invention relates to an apparatus for controlling linear voltage of an electrical circuit, for example the light circuit supplying illumination to interiors, such as schoolrooms, offices, inspection departments of factories, and other places requiring a constant predetermined intensity of light throughout the day, and has for its principal object to provide an apparatus of this character for automatically supplying an artificial light of an intensity that is variable inversely with change in the intensity of natural light, whereby the total illumination is kept at a predetermined constant level.

It is also an important object of the invention to provide a control apparatus that is responsive to change in intensity of light and which effects corresponding change in current voltage of an electrical circuit by means of a saturable core reactor.

Other objects of the invention are to provide an apparatus that is adjustable to maintain any desired intensity of light; to provide a constant light volume substantially free of flickers and undulating effects incidental to operation of the control apparatus; and to provide for automatic voltage control of an electrical circuit.

In accomplishing these and other objects of the invention, as hereinafter pointed out, we have provided improved details of structure, the preferred form of which is illustrated in the accompanying drawing, wherein.

Figure 1:
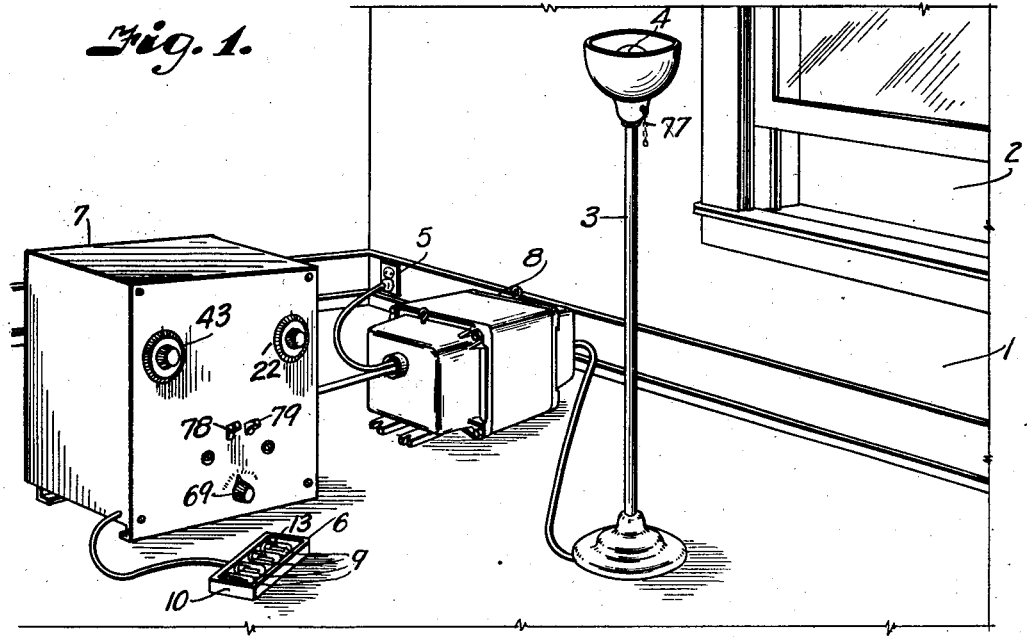
Fig. 1 is a perspective view of a portion of a room that is illuminated by artificial and natural light, and which is equipped with an apparatus for controlling the intensity of the artificial light responsive to change in the natural light, so that the total light intensity is maintained at a constant predetermined value.
Figure 2:
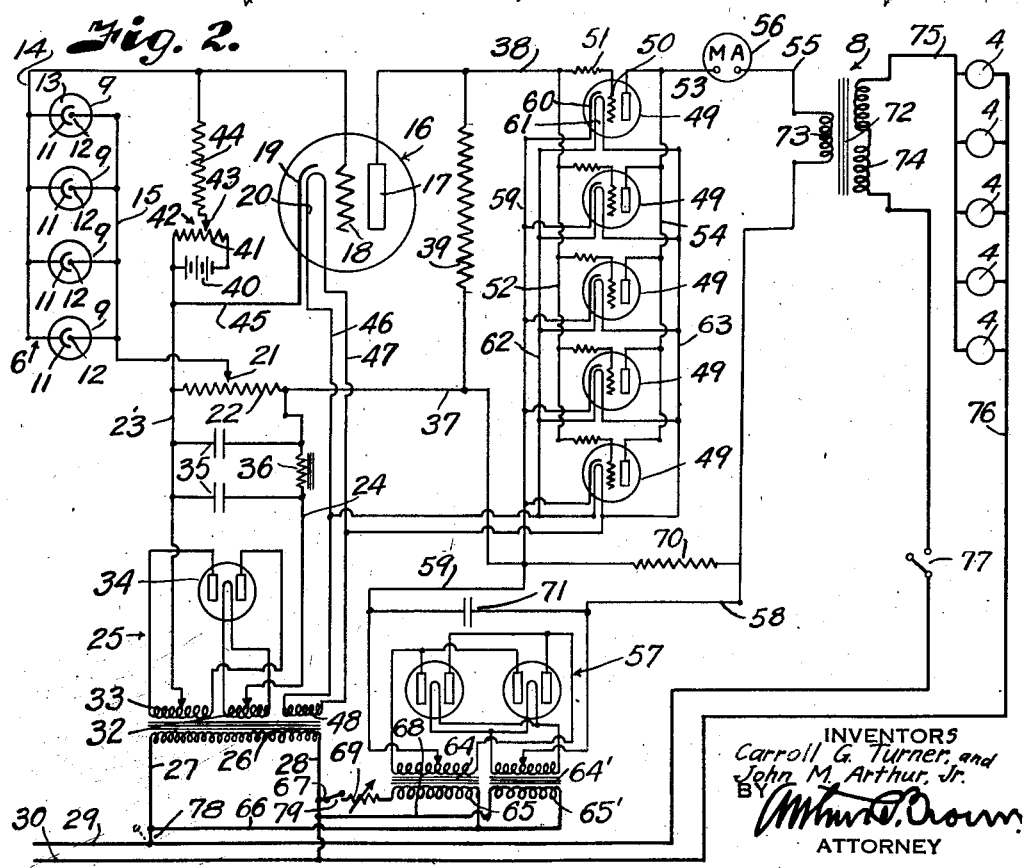
Fig. 2 is a diagrammatic view of the apparatus illustrated in Fig. 1.

Referring more in detail to the drawing:

1 designates a room that is illuminated both by natural and artificial light, the natural light being admitted through a window 2 and the artificial light supplied by electric light fixtures 3 which include electric lamps 4 supplied with current from the usual lighting circuit, as indicated by the plug-in connection 5. Under normal natural light conditions, as when the sun is shining brightly, the room may be sufficiently illuminated by the light rays passing through the window 2, but when the intensity of the natural light drops below the foot candle rating required to illuminate the room adequately, it is necessary to turn on current to the lamps 4 for supplementing the natural light with the required amount of artificial light.

In order to maintain a constant light intensity in the room, it is desirable to control the artificial light inversely to change in intensity of the natural light so when the daylight lessens, the intensity of the artificial light will be proportionately increased and vice versa. We, therefore, provide an apparatus that is responsive to variation in light intensity for automatically controlling the artificial light in such a manner that the total illumination is practically constant and substantially free of undulations incidental to operation of the control apparatus.

The control apparatus includes a light sensitive means 6 for influencing flow of current through an amplifying unit 7, the output of which is delivered to a reactor 8 for controlling voltage of the current supplying the lamp or lamps 4.

The light sensitive element 6 includes a plurality of cells 9 that may be collectively mounted within a single tray-like support 10, or they may be individually arranged in different parts of the room and interconnected so that the artificial light is controlled by the mean effects of light intensities falling upon the respective cells.

The cells 9 are of conventional type and each includes a cathode 11 and an anode 12 sealed within a gas-filled bulb 13, the cathode being treated with a compound that is sensitive to light so that the light rays falling thereon determine the electrical resistances of the cells and consequently the amount of current which the tube will pass when a voltage is applied thereto. The anodes and cathodes of the respective tubes are connected in parallel by conductors 14 and 15, leading to the amplifying unit 7.

The unit 7 includes an amplifying tube 16 having a plate 17, a grid 18, a cathode 19, and a filament 20 for heating the cathode so that electrons are discharged from the cathode to the plate as regulated by the negative charge on the grid. The conductor 14 is directly connected with the grid 18, while the conductor 15 is connected with the movable contact 21 of a variable resistance 22, the terminal ends of which are supplied with a direct current potential through conductors 23 and 24 leading from a full wave rectifier 25 that is also included in the unit 7, the rectifier 25 being supplied with current through the primary of a transformer 26, having its terminals connected by conductors 27 and 28 with an alternating current source which may be the house lighting circuit, including the wires 29 and 30.

The secondaries 32 and 33 are respectively connected with a filament and plates of a full wave rectifier tube 34, and the center taps of the secondaries are connected with the conductors 23 and 24 so that direct current is delivered to the terminals of the variable resistance 22, whereby the voltage of the current is regulated to the light sensitive cells. The wires 23 and 24 are interconnected with the usual filter condensers 35 interposed on the positive side by a filter choke 36. Voltage is impressed upon the plate 17 of the tube 16 by way of conductors 37 and 38 which include the grid circuits of a series of amplifying tubes, later described, a plate resistance 39 being connected across the conductors 37 and 38.

The grid voltage of the tube 16 is kept negative relatively to the cathode 19. This is effected by means of a potentiometer controlled grid bias, which includes a "C" battery 40 that is connected across a resistance element 41 of a potentiometer 42, having its movable contact 43 connected through a grid resistor 44 with the conductor 14, the "C" battery being arranged so that the positive terminal is connected with the cathode 19 through a conductor 45, which also connects with the conductor 23.

The filament 20 of the amplifying tube is supplied with an alternating current through conductors 46 and 47 that connect with a secondary winding 48 associated with the primary winding 26 for heating of the cathode 19 and effecting discharge of electrons to the plate 17 whereby current is caused to flow in the plate circuit as governed by the negativeness of the grid 18.

The output of the tube 16 is further amplified by a plurality of phase reversing amplifying tubes 49 which have their grids 50 connected with the conductor 38 through resistances 51 and a common connecting conductor 52. The plates 53 of the tubes are interconnected by a common conductor 54 that connects with the input of the reactor 8 through a conductor 55 in which is connected a milli-ammeter 56, the circuit being completed to the positive side of a double tube two-wave rectifier unit 57 by a conductor 58, the negative side of which is connected by a conductor 59 with the cathode terminals 60 of the respective tubes. The filaments 61 of the tubes are supplied with an alternating current through conductors 62 and 63 connected with the conductors 46 and 47, previously described. The plate and filament circuits of the rectifier 57 are supplied by separate transformers 64 and 64', the primary windings 65 and 65' of which have one of their leads connected by a common conductor 66 with the conductor 27 and their other leads connected with the conductor 28 by conductors 67 and 68 respectively. In order to protect the tubes 49, the conductor 67 includes a line voltage regulator 69 so that the direct current voltage is kept within the limits of the tubes dependent upon the number of reactors in the plate circuit. Connected across the conductors 58 and 59 is a resistor 70, which acts as a bleeder for the D. C. supply voltage from the tube 57. The conductors 58 and 59 are also connected by a filter condenser 71.

The reactor 8 includes a laminated iron core 72, a winding 73 for the direct current output of the unit 7, and a winding 74 for the alternating current supplying the lamps 4, the windings 73 and 74 being so arranged that all transformer action is prevented. The winding 74 is connected in series with one side of the lamp terminals through a conductor 75 that connects with the line wire 29, while the other side of the lamps connect by a conductor 76 with the other line wire 30. The circuit, including the lamp or lamps 4, is opened and closed by a manual switch 77 and the primaries of the transformer circuits by switches 78 and 79 respectively.

An apparatus constructed and assembled as described operates as follows:

The light sensitive element 6 is placed in position so that the light striking the sensitized surfaces of the cathodes acts to control the current to the lamps 4 through the amplifying unit 7 and reactor 8, as now to be described.

Assuming that the wires 29 and 30 are engaged with the plug connection 5, and the switch 77 is closed, an alternating current, usually 115 volt A. C. 60 cycles, is supplied to the lamps through the conductors 75 and 76 but the choking effect of the winding 74 prevents flow of current through the lamps. Upon closing of the switches 78 and 79 an alternating current is also supplied to the rectifiers 25 and 57, the voltage of the current flowing through the primary 65 being regulated by the line voltage regulator 69. If light rays of a certain intensity are falling upon the cells 9, a direct current then flows from the output of the rectifier 25 through the conductor 24, variable resistance 22, conductor 15, to the anodes 12 and across to the cathodes 11 of the respective photoelectric cells 9, through the conductor 14 to the grid circuit, which impresses voltage change upon the grid 18 of the amplifying tube 16, the amount of current flowing in the grid circuit resistor 44 being proportional to intensity of the light falling upon the sensitized surfaces.

There is also an alternating current flowing through the conductors 46 and 47, through the filament 20 to heat the cathode 19 so that there is an electron discharge from the cathode to the plate 17, the intensity of which is dependent upon the grid bias of the tube under control of the potentiometer 42, which maintains a steady negative voltage of the "C" battery on the grid. When the current is caused to pass through the photocells, the voltage thereof opposes the steady negative voltage of the "C" battery on the grid 18 so that the relative negative voltage between the grid 18 and cathode 19 varies in accordance with voltage of the current passed through the light sensitive cells. For example, the greater the light intensity the greater is the current flowing in the grid circuit resistor 44 and vice versa. The negative potential on the grid thus becomes less with increased flow of current through the cells but approaches the negativeness of the "C" bias as the current ceases to flow through the cells. This variation in the negative potential of the grid causes corresponding variation in the plate current that is flowing through the conductors 24, 37 and 38, plate resistance 39, plate 17, cathode 19, conductors 45 and 23, to the negative side of the rectifier. When no current is passed through the cells the plate current is at its minimum predetermined by the negative bias of the grid as controlled by the potentiometer 42, but as the grid current through the cells increases responsive to increased light intensities which counteracts the negative grid voltages, the plate current increases toward its maximum. With maximum current flow in the plate circuit of the tube 16, the negative potential of the grid circuits for the phase-reversing tubes 49 are more negative and therefore reduce the plate current of the tubes to a minimum so that there is little or no current flowing through the winding 73 of the saturable core reactor, and the winding 74 is effective in dimming out the lights 4 depending upon the adjustment of the potentiometer 42. However, as the plate current of the tube 16 decreases, the potentials of the grids become less negative with the result that the plate current of the tubes 49 increases to the point where excitation effect of the current passing through the winding 73 reaches its maximum.

Assuming that there is sufficient natural light admitted to the room to effect activation of the light sensitive cells to pass the maximum current therethrough, the negative charge on the grid 18 becomes less so as to increase flow in the plate circuit of the tube 16, consequently the current flow in the grid resistor 39 is increased thereby increasing the negative grid voltage of the tubes 49 to effect corresponding decrease in current flow through the plate circuits of these tubes so that the inductance or choking effect of the winding 74 is effective to dim the lights completely out. As the natural light becomes less there is less light striking the sensitized cathodes of the cells 9, consequently the counteracting grid voltage on the grid 18 becomes less so that the grid becomes more negative, thereby effecting reduction in the plate current output of the tube 16, which causes increased current flow in the plate circuits of the set of amplifying tubes 49 so that current flows through the direct current winding 73 to overcome the inductance or choking effect of the winding 74 in the lighting circuit. The lamps will therefore light to add artificial illumination, the intensity being proportional to the change in voltage of the lighting circuit. As the natural light is further reduced, there will be a corresponding voltage change across the reactor windings so that the lights burn with greater brightness to compensate for the additional reduction in intensity of the natural light.

By varying the position of the potentiometer 42 and by controlling the variable resistance 22, any predetermined degree of light intensity can be obtained regardless of variation in intensity of the natural light, the combined intensities of the respective lights balancing with the sensitivity effect of the light sensitive cells to maintain light intensity of a uniform level.

While we have specifically described the invention as used in connection with light circuits, it is obvious that other electrical apparatus, such as variable speed motors, heat control devices, voltage regulator stations and other apparatus controllable responsive to artificial, natural or reflected light, or to radiant heat from a luminous body may be similarly operated, in which instances the controlled device would be connected into the circuit including the wires 75 and 76 without departing from the spirit of the invention.

What we claim and desire to secure by Letters Patent is:

In an illuminating apparatus for maintaining substantially uniformly constant light under variable natural light conditions, artificial lighting means, a closed circuit for said lighting means including a source of alternating current and a saturable core reactor having inductive windings normally opposing the flow of alternating current through said circuit and having a control winding, means for controlling the intensity of the artificial lighting means in inverse proportion to the intensity of said natural light conditions comprising a light sensitive cell disposed in a region affected by both the natural light conditions and by the artificial lighting means whereby its internal resistance varies in inverse proportion to the intensity of the combined illumination falling upon the same, means for applying a constant potential differential across the cell, an electronic amplifier coupled to the output of the light sensitive cell, and means including a phase reversing direct current electronic amplifier coupled to the output circuit of said other amplifier for supplying direct current to said control winding of the reactor in inverse proportion to the current flow through the cell.

CARROLL G. TURNER.
JOHN M. ARTHUR, JR.